United States Patent [19]

Matena et al.

[11] Patent Number: 5,941,999
[45] Date of Patent: Aug. 24, 1999

[54] METHOD AND SYSTEM FOR ACHIEVING HIGH AVAILABILITY IN NETWORKED COMPUTER SYSTEMS

[75] Inventors: Vladimir Matena, Redwood City; Kenneth William Shirriff, Mountain View; Declan J. Murphy, San Francisco, all of Calif.

[73] Assignee: Sun Microsystems, Palo Alto, Calif.

[21] Appl. No.: 08/829,156

[22] Filed: Mar. 31, 1997

[51] Int. Cl.$^6$ ..................................................... G06F 11/00
[52] U.S. Cl. ..................... 714/714.06; 711/100; 711/156; 364/245.3; 364/285.3
[58] Field of Search ........................ 395/182.08, 182.04, 395/680, 200.38; 707/202, 201; 711/117, 162; 714/10, 6; 709/208, 300

[56] References Cited

U.S. PATENT DOCUMENTS

| | | | |
|---|---|---|---|
| 5,157,663 | 10/1992 | Major et al. ........................ | 395/182.08 |
| 5,423,037 | 6/1995 | Hvasshovd .............................. | 707/202 |
| 5,434,994 | 7/1995 | Shaheen et al. ........................ | 707/201 |
| 5,440,727 | 8/1995 | Bhide et al. ............................ | 711/117 |
| 5,455,932 | 10/1995 | Major et al. ............................ | 711/162 |
| 5,513,314 | 4/1996 | Kandasamy et al. .............. | 395/182.04 |
| 5,537,645 | 7/1996 | Henson et al. .......................... | 395/680 |
| 5,544,347 | 8/1996 | Yanai et al. .............................. | 711/162 |
| 5,555,404 | 9/1996 | Torbjornsen et al. .................. | 707/202 |
| 5,764,903 | 6/1998 | Yu ..................................... | 395/200.38 |

Primary Examiner—John W. Cabeca
Assistant Examiner—Fred F. Tzeng
Attorney, Agent, or Firm—Park & Vaughan

[57] ABSTRACT

The present invention provides a method and system for achieving high availability in networked computer systems. The computer system includes a client node, two server nodes, and a secondary storage device. One server node includes a primary replica, and the other server node includes a secondary replica. In order for the client node to request a service that involves the secondary storage device, the client node sends a request for the service to the primary replica. The primary replica performs an intention phase of the service and sends a checkpoint message to the secondary replica. The secondary replica updates the state of the secondary replica and sends an acknowledgement message to the primary replica. The primary replica performs the service, sends a reply message to the client node, and forgets about the request. The client node resumes execution and asynchronously sends a forget message to the secondary replica. Upon receiving the forget message, the secondary replica forgets about the request.

33 Claims, 7 Drawing Sheets

METHOD AND SYSTEM FOR ACHIEVING HIGH AVAILABILITY IN NETWORKED COMPUTER SYSTEMS

FIELD OF THE INVENTION

The present invention relates generally to networked computer systems and, more particularly, to a method and system for achieving high availability in networked computer systems.

BACKGROUND OF THE INVENTION

Networked computer systems enable users to share resources or services. One computer can request and use resources or services provided by another computer. The computer requesting and using the resources or services provided by another computer is typically known as a client, and the computer providing resources or services to another computer is typically known as a server. When a server fails in such a networked computer system, it is desirable for the system to recover from the failure in a way that is transparent to the clients. The ability of a system to detect and recover from the failure of a server with no or little impact on the clients is known as high availability.

One method for achieving high availability in networked computer systems is fault tolerance at the hardware level. A particular implementation of this method is known as triple module redundancy or "TMR." With TMR, three instances of the same hardware module concurrently execute. By comparing the results of the three hardware modules and using the majority results, the failure of any of the hardware modules can be detected. The primary disadvantage of TMR is that TMR does not detect and recover from the failure of software modules.

Another method for achieving high availability in networked computer systems is software replication. With software replication, a software module that provides a service to clients is replicated on at least two different nodes in the system. The software module on each node is referred to as a replica. If one replica fails, client requests for the service are routed to any remaining replicas. As long as at least one replica has not failed, the service provided by the software module remains available to the clients. Thus, software replication detects and recovers from the failure of both hardware modules and software modules.

While software replication overcomes the primary disadvantage of TMR (i.e., that TMR does not detect and recover from the failure of software modules), software replication has its own disadvantages. The primary disadvantage of software replication is that software replication requires complex software protocols. These protocols are necessary to ensure that all of the replicas have the same state. These protocols are also necessary to ensure that all client requests are completely executed exactly once by all replicas, even in the event of a failure of one replica. For obvious reasons, it is undesirable for one replica to completely execute a request and fail after completely executing the request and then for another replica to completely execute the same request. Due to their complexity, some of these protocols are very inefficient and decrease the processing capacity of the system. Therefore, a need exists for a software replication protocol that is more efficient and increases the processing capability of the system.

SUMMARY OF THE INVENTION

The present invention provides a method and system for achieving high availability in networked computer systems. The method and system include a software replication protocol that is more efficient and increases the processing capability of the system.

The networked computer system includes a client node and two server nodes. The client node is any computer requesting services, and the server nodes are any computers providing services. The client node and the server nodes are connected to one another via a network. The client node includes an application program and a communication subsystem. One server node includes a primary replica, and the other server node includes a secondary replica. The networked computer system also includes a secondary storage device. The secondary storage device is directly connected to both of the server nodes.

The principles of the present invention apply to networked computer systems in which the service provided by the primary replica and the secondary replica is performed locally on the primary replica or the secondary replica, as well as to networked computer systems in which the service provided by the primary replica and the secondary replica involves a secondary storage device. While the principles of the present invention apply to networked computer systems in which either or both types of services are provided, additional steps need to be taken when the service involves a secondary storage device because the state of the secondary storage device must be considered in addition to the state of the primary replica. These additional steps ensure the integrity of the secondary storage device. When the service is performed locally, only the state of the primary replica has to be considered.

In order for the client node to request a service that is performed locally on the primary replica or the secondary replica, the client node sends a request for the service to the primary replica. The primary replica performs the requested service. If necessary, while performing the requested service, the primary replica acquires locks to serialize execution of conflicting requests to the same data. The primary replica then sends a checkpoint message to the secondary replica. The secondary replica uses certain data from the checkpoint message to update the state of the secondary replica to reflect any change in the state of the primary replica and saves certain data from the checkpoint message. The secondary replica then sends an acknowledgement message to the primary replica. The primary replica releases any acquired locks and sends a reply message to the client node. The primary replica then forgets about the request. The client node resumes execution and can use the data from the reply message. The client node also asynchronously sends a forget message to the secondary replica. The secondary replica then forgets about the request.

In order for the client node to request a service that involves the secondary storage device, the client node sends a request for the service to the primary replica. The primary replica performs an intention phase of the requested service. If necessary, while performing the intention phase of the requested service, the primary replica acquires locks to serialize execution of conflicting requests to the same data. The primary replica then sends a checkpoint message to the secondary replica. The secondary replica uses certain data from the checkpoint message to update the state of the secondary replica to reflect any intended change in the state of the primary replica and saves certain data from the checkpoint message. The secondary replica then sends an acknowledgement message to the primary replica. The primary replica performs the requested service, releases any acquired locks, and sends a reply message to the client node. The primary replica then forgets about the request. The client node resumes execution and can use the data from the reply message. The client node also asynchronously sends a forget message to the secondary replica. The secondary replica then forgets about the request.

DETAILED DESCRIPTION OF THE INVENTION

The present invention provides a method and system for achieving high availability in networked computer systems. The method and system include a software replication protocol that is more efficient and increases the processing capability of the system.

Figure 1:
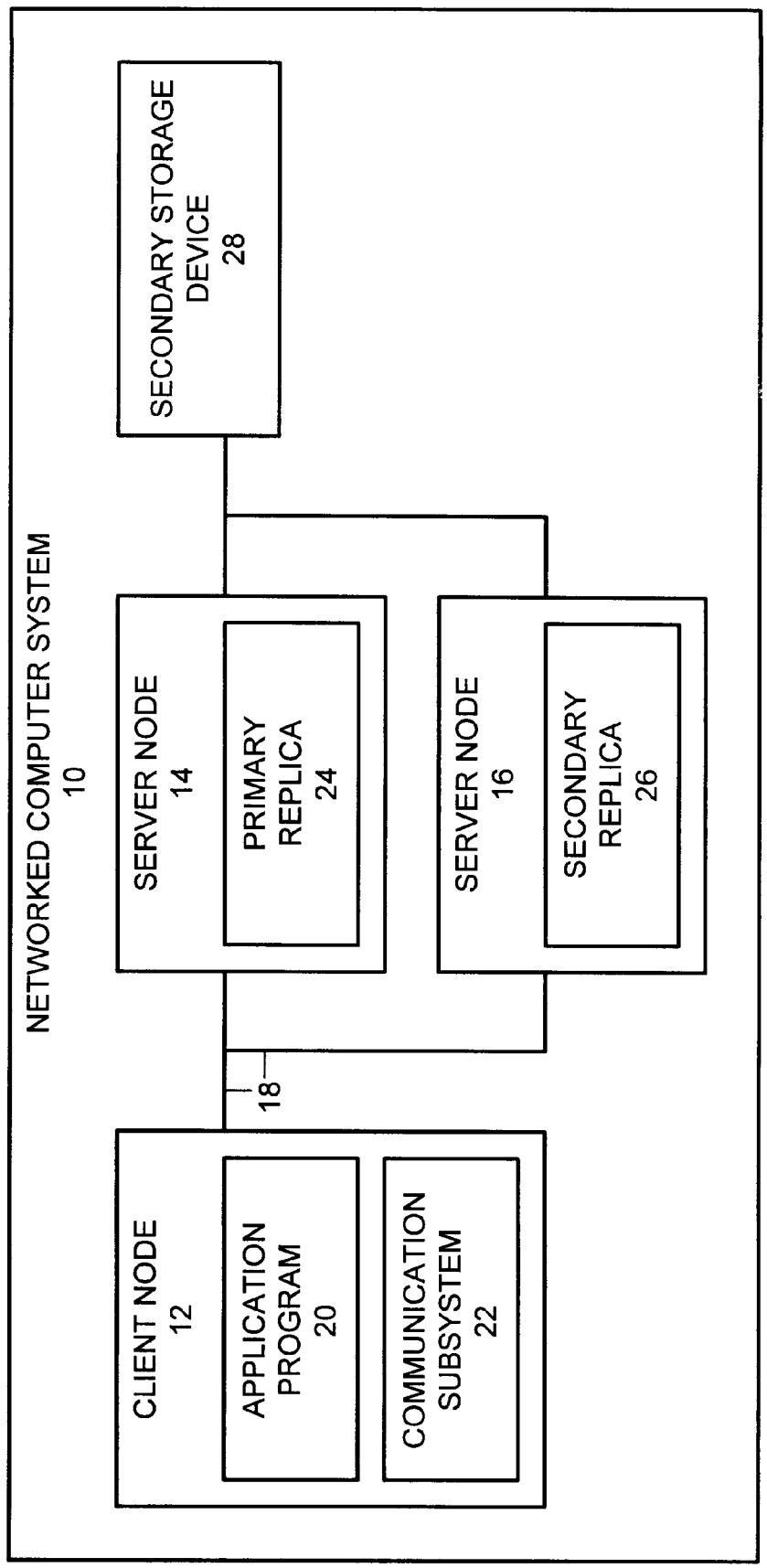
FIG. 1 is a block diagram illustrating the components of a networked computer system in which one embodiment of the present invention operates.

A networked computer system 10 in which one embodiment of the present invention operates is illustrated in FIG. 1. The networked computer system 10 can be implemented as a cluster. The networked computer system 10 includes a client node 12 and server nodes 14 and 16. The client node 12 is any computer requesting services, and the server nodes 14 and 16 are any computers providing services. The client node 12 and the server nodes 14 and 16 are connected to one another via a network 18. The client node 12 includes an application program 20 and a communication subsystem 22. The server node 14 includes a primary replica 24, and the server node 16 includes a secondary replica 26. The networked computer system 10 also includes a secondary storage device 28. The secondary storage device 28 is directly connected to both of the server nodes 14 and 16.

The client node 12 and the server nodes 14 and 16 typically include a central processing unit and primary storage (not separately shown). Additionally, the client node 12 and the server nodes 14 and 16 typically are connected to any number of input/output or "I/O" devices, such as monitors, keyboards, printing devices, and secondary storage devices (not separately shown other than secondary storage device 28). These components of the client node 12 and the server nodes 14 and 16 are well-known in the art and will not be described in greater detail.

For the sake of simplicity, the networked computer system 10 of the present invention has been illustrated with one client node 12 and two server nodes 14 and 16. However, one of ordinary skill in the art will appreciate that the networked computer system 10 could include any number of client nodes and any number of server nodes (and typically, would include a multiple number of client nodes and a multiple number of server nodes). Each additional client node and server node would be connected to the others via the network 18 and would include components similar to those described above in connection with the client node 12 and the server nodes 14 and 16.

Additionally, for the sake of simplicity, the networked computer system 10 of the present invention has been illustrated with one primary replica 24 and one secondary replica 26. However, one of ordinary skill in the art will appreciate that the networked computer system 10 could include any number of secondary replicas corresponding to the primary replica 24 (and typically, would include a multiple number of secondary replicas corresponding to the primary replica 24). Each additional secondary replica would operate in a manner similar to that described below in connection with the secondary replica 26.

The principles of the present invention apply to networked computer systems in which the service provided by the primary replica and the secondary replica is performed locally on the primary replica or the secondary replica, as well as to networked computer systems in which the service provided by the primary replica and the secondary replica involves a secondary storage device. Exemplary replicas that provide local services include name servers and network lock managers, and exemplary replicas that provide services involving a secondary storage device include file systems and repository servers. While the principles of the present invention apply to networked computer systems in which either or both types of services are provided, additional steps need to be taken when the service involves a secondary storage device because the state of the secondary storage device must be considered in addition to the state of the primary replica. These additional steps ensure the integrity of the secondary storage device. When the service is performed locally, only the state of the primary replica has to be considered.

As stated above, the additional steps taken when the service involves a secondary storage device ensure the integrity of the secondary storage device. If these additional steps were not taken, the primary replica could fail after performing the service (and thus, changing the state of the secondary storage device), but before sending a checkpoint message to the secondary replica. In this case, the integrity of the secondary storage device could be compromised because the secondary replica would not be able to determine whether the primary replica had performed the service (and thus, changed the state of the secondary storage device).

Figure 2A:
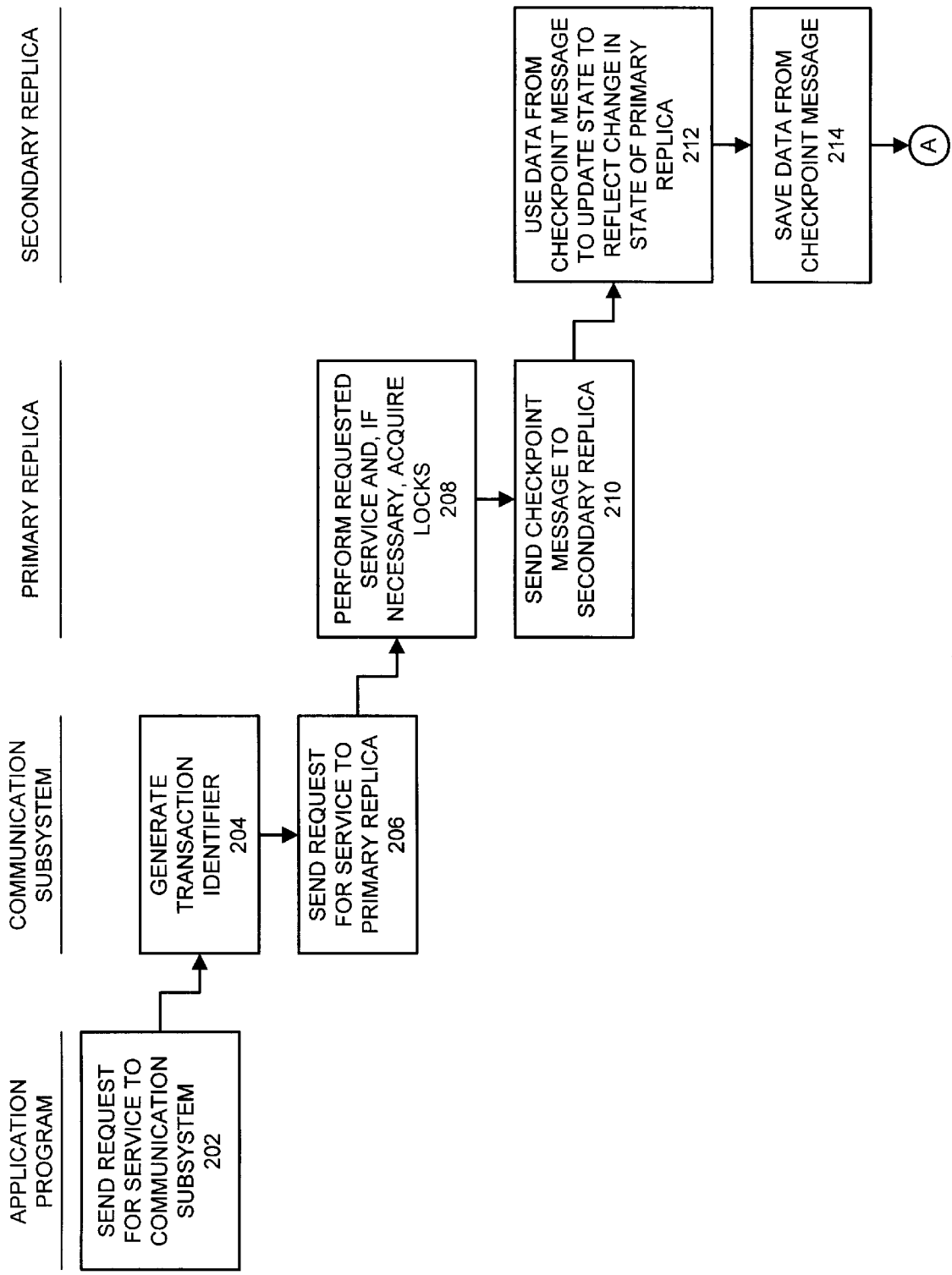
FIGS. 2A and 2B collectively are a flowchart generally illustrating the steps performed in the operation of the networked computer system of FIG. 1 when a service provided by a primary replica and a secondary replica is performed locally on the primary replica or the secondary replica.
Figure 2B:
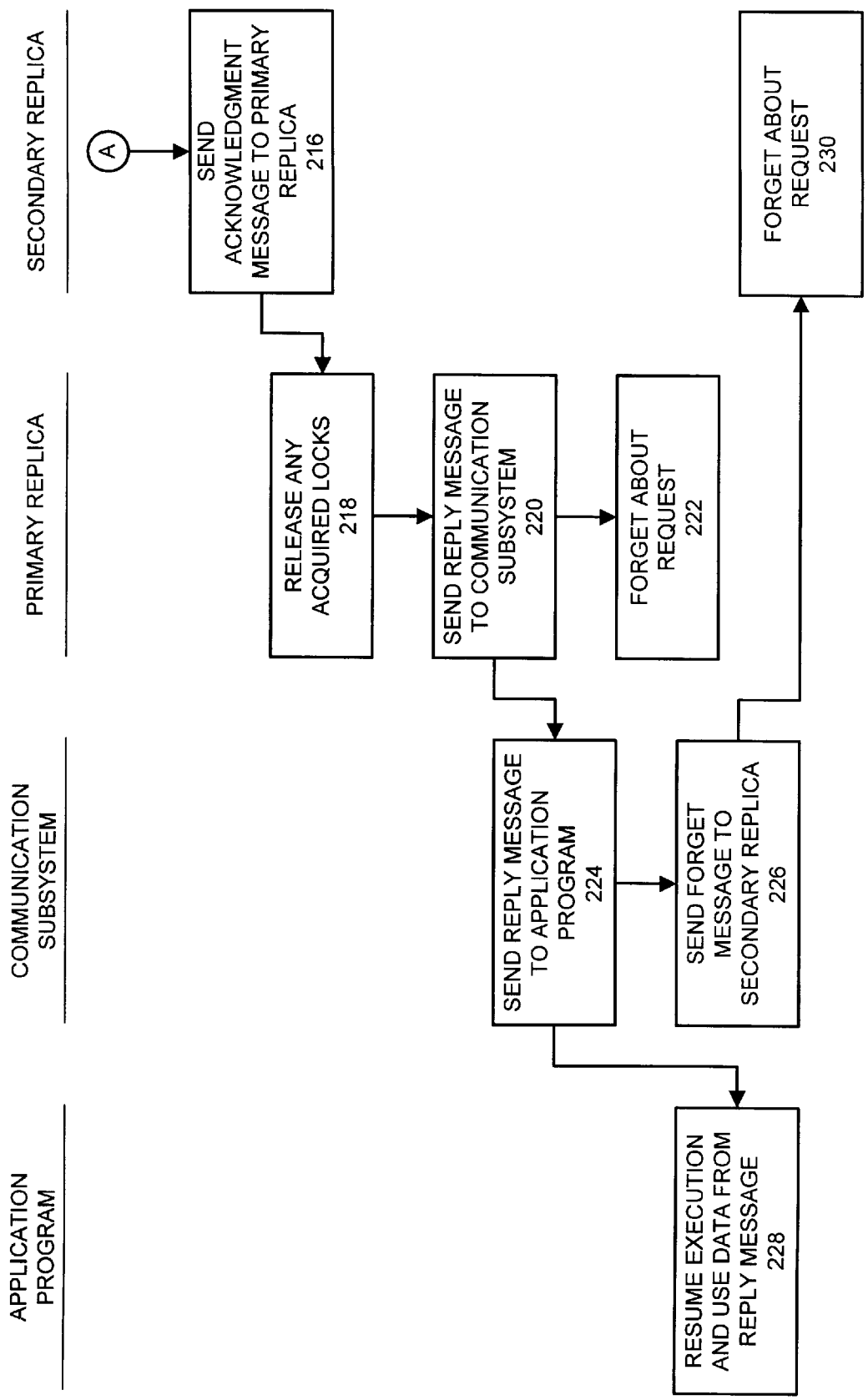

FIGS. 2A and 2B generally illustrate the steps performed in the operation of the networked computer system 10 of FIG. 1 when the service provided by the primary replica 24 and the secondary replica 26 is performed locally on the primary replica or the secondary replica. Initially, in order for the application program 20 to request a service, the application program sends a request for the service to the communication subsystem 22 (step 202). The communication subsystem 22 generates a transaction identifier or "TID" (step 204). The TID uniquely identifies the request for the service. The communication subsystem 22 then sends a request for the service to the primary replica 24 (step 206). The request includes the TID. After receiving the request from the communication subsystem 22, the primary replica 24 performs the requested service (step 208). If necessary, while performing the requested service, the primary replica 24 acquires locks to serialize execution of conflicting requests to the same data and, thus, prevent simultaneous access to the same data. The use of locks in computer systems is well-known in the art and will not be described herein.

Before releasing any acquired locks, the primary replica 24 sends a checkpoint message to the secondary replica 26 (step 210). The checkpoint message includes: (1) data representing any change in the state of the primary replica 24 as a result of performing the requested service, (2) the TID, and (3) data necessary for the secondary replica 26 to construct the content of the reply message that the primary replica is going to send to the application program 20 through the communication subsystem 22. After receiving the checkpoint message from the primary replica 24, the secondary replica 26 uses the data regarding the state of the primary replica from the checkpoint message to update the state of the secondary replica to reflect any change in the state of the primary replica (step 212). Additionally, the secondary replica 26 saves the TID and the data regarding the reply message from the checkpoint message (step 214). The secondary replica 26 then sends an acknowledgement message to the primary replica 24 (step 216).

After receiving the acknowledgement message from the secondary replica 26, the primary replica 24 releases any acquired locks (step 218). The primary replica 24 then sends a reply message to the communication subsystem 22 (step 220). At this point, the primary replica 24 forgets about the request, i.e., does not save any data regarding the request (step 222). After receiving the reply message from the primary replica 24, the communication subsystem 22 sends the reply message to the application program 20 (step 224) and also asynchronously sends a forget message to the secondary replica 26 (step 226). The forget message includes the TID. In another embodiment of the present invention, the forget messages relating to a number of requests are sent to the secondary replica 26 as a batch. After receiving the reply message from the communication subsystem 22, the application program 20 resumes execution and can use the data from the reply message (step 228). After receiving the forget message from the communication subsystem 22, the secondary replica 26 forgets about the request, i.e., releases the saved TID and the data regarding the reply message (step 230).

If the primary replica 24 or the secondary replica 26 fails during operation of the networked computer system 10 when the service provided by the primary replica and the secondary replica is performed locally on the primary replica or the secondary replica, the system takes steps to recover from the failure. The steps to be taken depend upon which replica fails and at what point during operation the replica fails. The possible failures include:

1. the secondary replica 26 fails at any time;

2. the primary replica 24 fails before the primary replica receives the request from the communication subsystem 22;

3. the primary replica 24 fails after the primary replica receives the request from the communication subsystem 22, but before the primary replica sends the checkpoint message to the secondary replica 26;

4. the primary replica 24 fails after the primary replica sends the checkpoint message to the secondary replica 26, but before the primary replica sends the reply message to the communication subsystem 22; and 5. the primary replica 24 fails after the primary replica sends the reply message to the communication subsystem 22. The recovery from each of these possible failures will be described in detail below. The detection of failures in computer systems is well-known in the art and will not be described herein.

In the first situation, where the secondary replica 26 fails at any time, no steps need to be taken to recover from the failure. Since the primary replica 24 did not fail, the requested service is performed and the reply message is sent to the communication subsystem 22. However, the primary replica 24 stops sending checkpoint messages to the secondary replica 26. If there is more than one secondary replica, the primary replica 24 continues sending checkpoint messages to any remaining secondary replicas.

In the fifth situation, where the primary replica 24 fails after the primary replica sends the reply message to the communication subsystem 22, no steps need to be taken to recover from the failure. When the primary replica 24 failed, the primary replica had already performed the requested service and sent a reply message to the communication subsystem 22.

In the second, third, and fourth situations, where the primary replica 24 fails at some time before the primary replica sends the reply message to the communication subsystem 22, steps need to be taken to recover from the failure. The specific steps to be taken depend upon at what point in time the primary replica 24 fails. In each of the second, third, and fourth situations, the communication subsystem 22 cannot determine when the primary replica 24 failed. Therefore, the communication subsystem 22 resends the request for the service to the secondary replica 26. The request includes the same TID that was sent to the primary replica 24 in the original request. The secondary replica 26 then determines when the primary replica 24 failed and takes the appropriate steps to recover from the failure based on the results of this determination.

Figure 3:
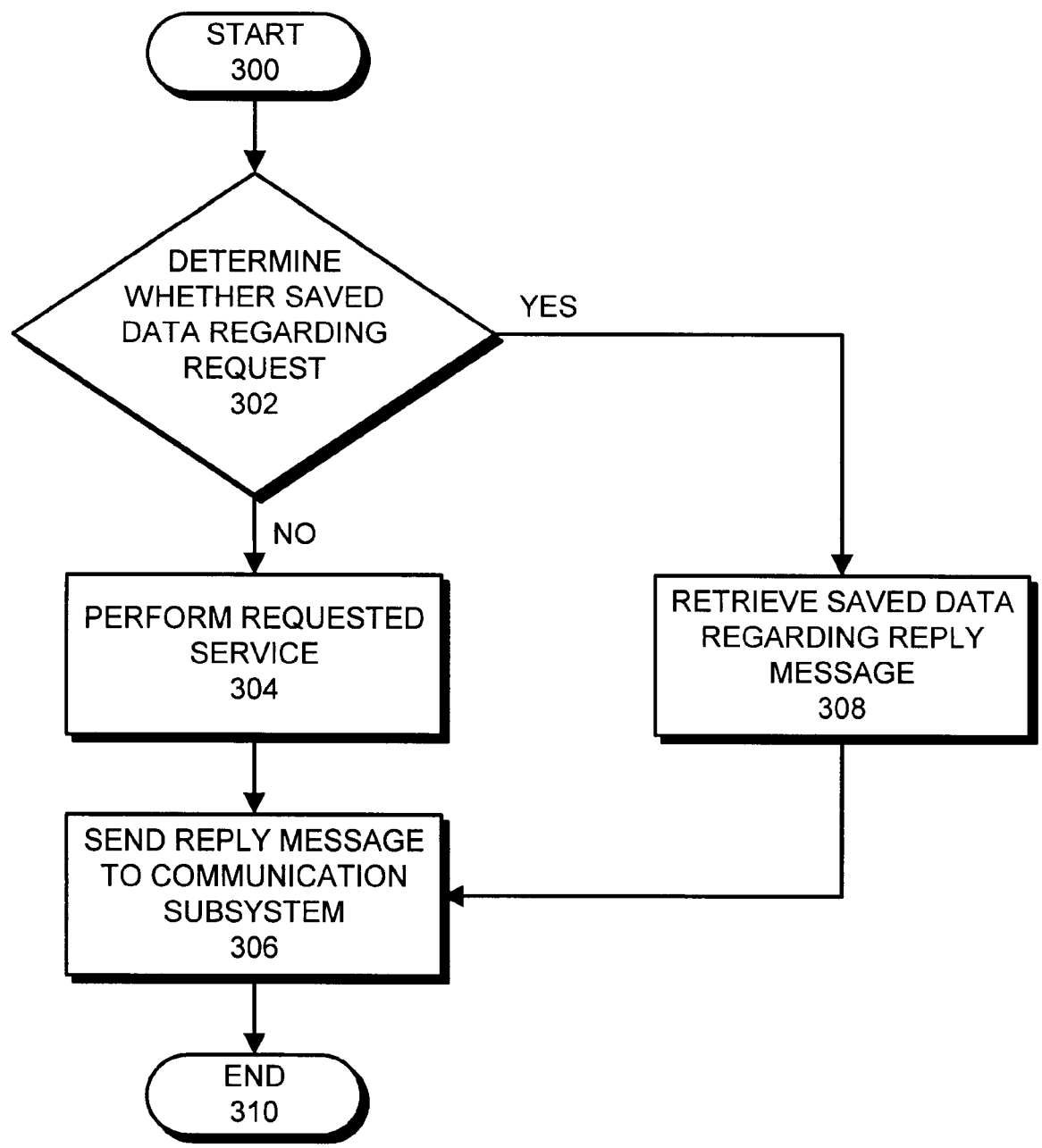
FIG. 3 is a flowchart generally illustrating the steps performed by the secondary replica in the recovery from certain failures of the primary replica in the operation of the networked computer system illustrated in FIGS. 2A and 2B.

FIG. 3 generally illustrates the steps performed by the secondary replica 26 to determine when the primary replica 24 failed and to recover from the failure. Initially, the secondary replica 26 determines whether the primary replica 24 had sent the checkpoint message before the primary replica failed. The secondary replica 26 makes this determination based on the data saved by the secondary replica when the secondary replica received checkpoint messages from the primary replica 24. The saved data included the TIDs uniquely identifying the requests. If the primary replica 24 had sent the checkpoint message before the primary replica failed, the secondary replica 26 will have saved data regarding the request and can use the saved data to reply to the communication subsystem 22. If the primary replica 24, however, had not sent the checkpoint message before the primary replica failed, the secondary replica 26 will not have saved data regarding the request and will have to process the request.

Referring to FIG. 3, the secondary replica 26 determines whether the secondary replica has saved data regarding the request (step 302). If the secondary replica 26 does not have saved data regarding the request, the primary replica 24 must have failed before the primary replica sent the checkpoint message (second or third situation). In this event, the secondary replica 26 performs the requested service (step 304) and then sends the reply message to the communication subsystem 22 (step 306). If the secondary replica 26 has saved data regarding the request, the primary replica 24 must have failed after the primary replica sent the checkpoint message (fourth situation). In this event, the secondary replica 26 retrieves the saved data regarding the reply message (step 308) and then sends the reply message to the communication subsystem 22 (step 306).

Additionally, in the second, third, fourth, and fifth situations, where the primary replica 24 fails, the communication subsystem 22 stops sending requests to the primary replica. In this event, the secondary replica 26 starts operating as the primary replica 24. If there is more than one secondary replica, any remaining secondary replicas continue operating as secondary replicas.

In each of the five failure situations described above, the protocol of the present invention behaves correctly. More specifically, the requested service is completely performed exactly once and the application program 20 receives the correct reply message. Furthermore, the state of the secondary replica 26 is consistent with the state of the primary replica 24.

Figure 4A:
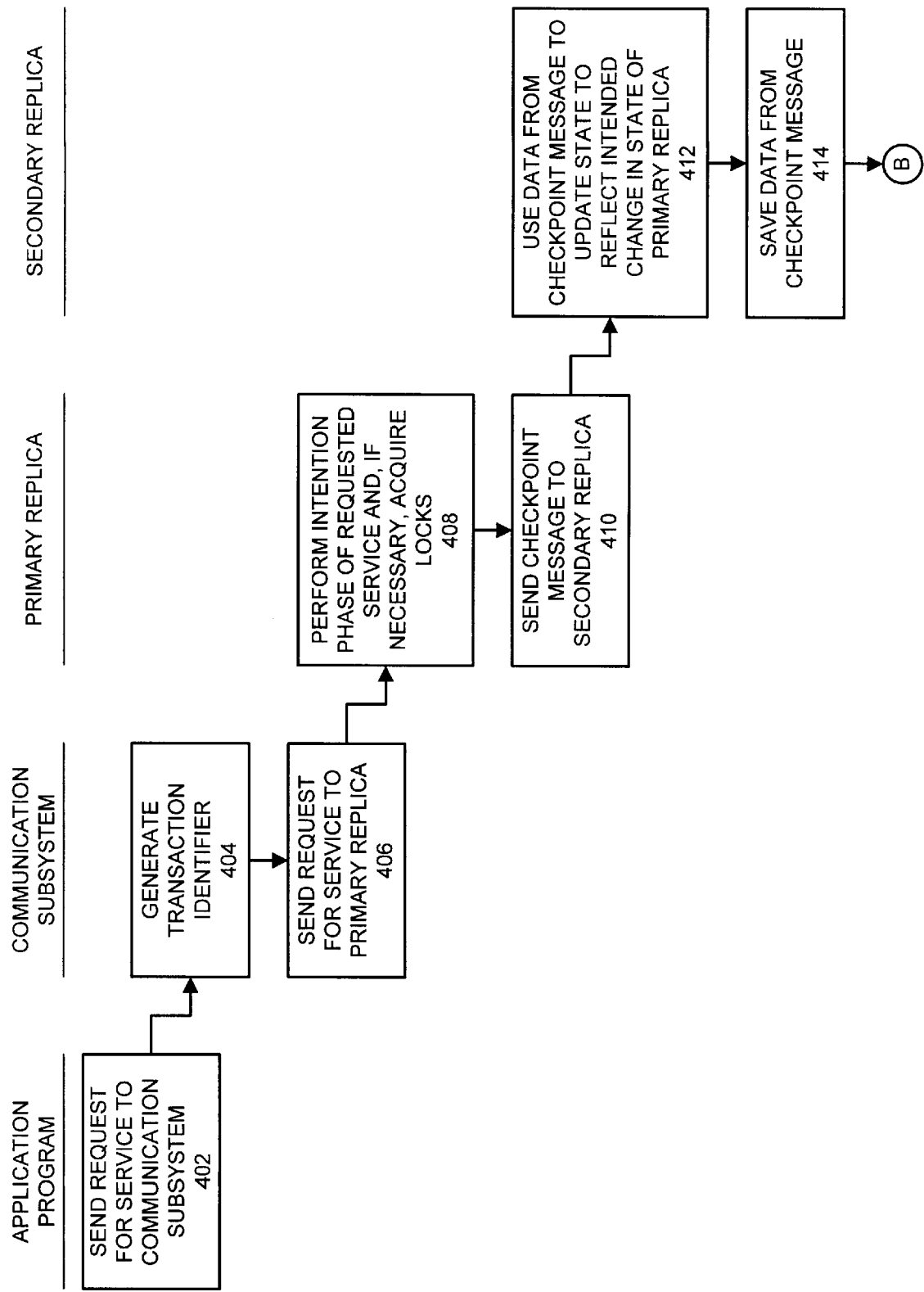
FIGS. 4A and 4B collectively are a flowchart generally illustrating the steps performed in the operation of the networked computer system of FIG. 1 when a service provided by a primary replica and a secondary replica involves a secondary storage device.
Figure 4B:
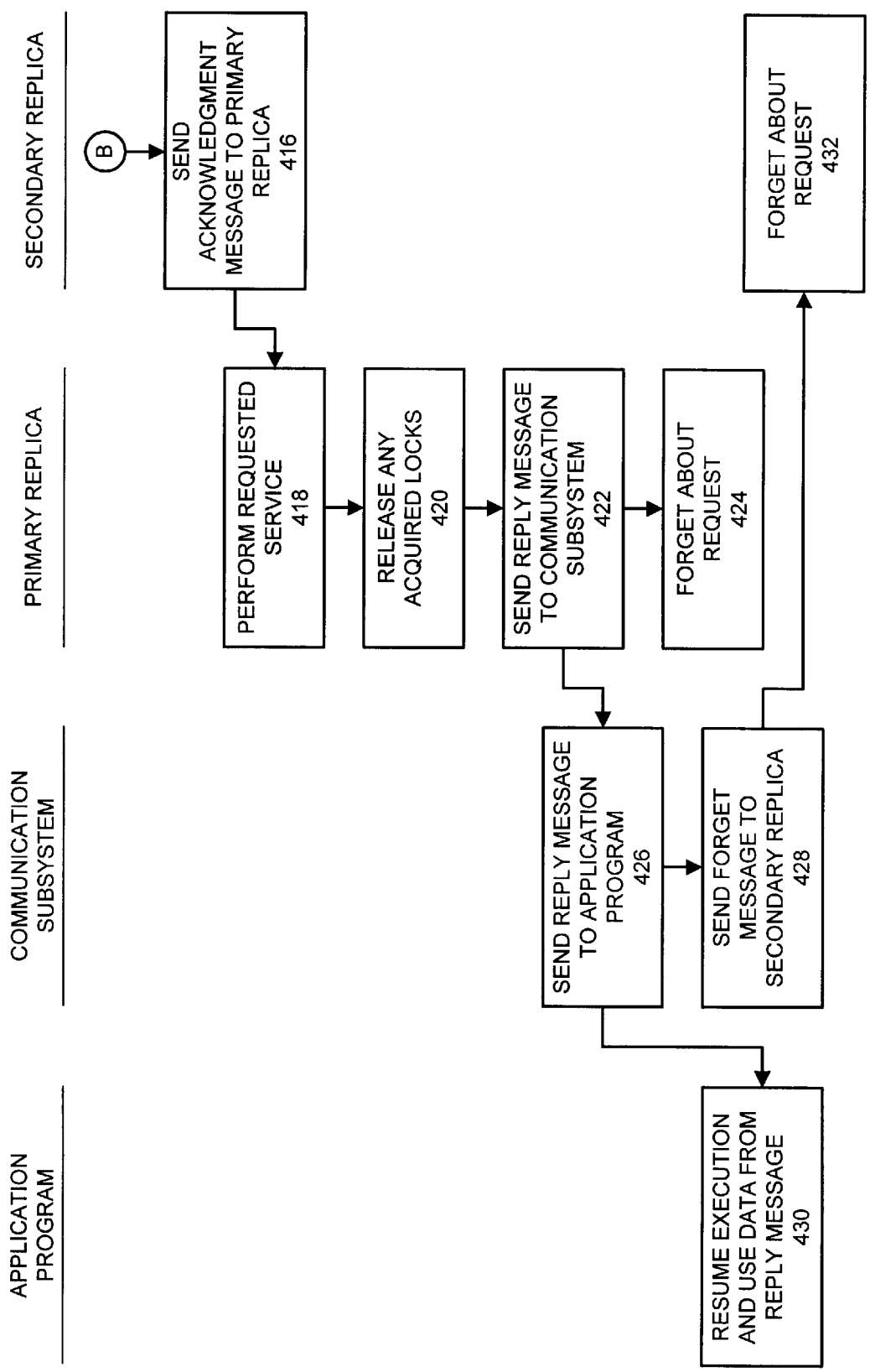

FIGS. 4A and 4B generally illustrate the steps performed in the operation of the networked computer system 10 of FIG. 1 when the service provided by the primary replica 24 and the secondary replica 26 involves the secondary storage device 28. Initially, in order for the application program 20 to request a service, the application program sends a request for the service to the communication subsystem 22 (step 402). The communication subsystem 22 generates a transaction identifier or "TID" (step 404). The TID uniquely identifies the request for the service. The communication subsystem 22 then sends a request for the service to the primary replica 24 (step 406). The request includes the TID. After receiving the request from the communication subsystem 22, the primary replica 24 performs an intention phase of the requested service (step 408). During the intention phase, the primary replica 24 determines whether the requested service can succeed. If necessary, while performing the intention phase of the requested service, the primary replica 24 acquires locks to serialize execution of conflicting requests to the same data and, thus, prevent simultaneous access to the same data. Again, the use of locks in computer systems is well-known in the art and will not be described herein.

If the primary replica 24 determines that the requested service cannot succeed, the primary replica releases any acquired locks, sends an error message to the communication subsystem 22, and forgets about the request, i.e., does not save any data regarding the request. The requested service cannot succeed, for example, if a file to be created already exists or if there is insufficient storage to create the file. The steps that are taken if the primary replica determines that the requested service cannot succeed are not shown in the figures.

If the primary replica 24 determines that the requested service can succeed, before releasing any acquired locks, the primary replica 24 sends a checkpoint message to the secondary replica 26 (step 410). The checkpoint message includes: (1) data representing any intended change in the state of the primary replica 24 as a result of performing the requested service, (2) the TID, (3) data necessary for the secondary replica 26 to construct the content of the reply message that the primary replica is going to send to the application program 20 through the communication subsystem 22, and (4) data necessary for the secondary replica to determine whether the requested service has been performed by the primary replica. After receiving the checkpoint message from the primary replica 24, the secondary replica 26 uses the data regarding the state of the primary replica from the checkpoint message to update the state of the secondary replica to reflect any intended change in the state of the primary replica (step 412). Additionally, the secondary replica 26 saves the TID, the data regarding the reply message, and the data regarding the performance of the requested service from the checkpoint message (step 414). The secondary replica 26 then sends an acknowledgement message to the primary replica 24 (step 416).

After receiving the acknowledgement message from the secondary replica 26, the primary replica 24 performs the requested service (step 418). Since the primary replica 24 determined that the requested service could succeed, the performance of the requested service should be successful.

If the performance of the requested service is not successful, however, the primary replica 24 sends a second checkpoint message to the secondary replica 26. The second checkpoint message notifies the secondary replica 26 that the performance of the requested service was not successful. After receiving the second checkpoint message from the primary replica 24, the secondary replica 26 forgets about the request, i.e., releases the saved TID, the data regarding the reply message, and the data regarding the performance of the requested service. Next, the primary replica 24 releases any acquired locks, sends an error message to the communication subsystem 22, and forgets about the request, i.e., does not save any data regarding the request. The steps that are taken if the performance of the requested service is not successful are not shown in the figures.

If the performance of the requested service is successful, the primary replica 24 releases any acquired locks (step 420). The primary replica 24 then sends a reply message to the communication subsystem 22 (step 422). At this point, the primary replica 24 forgets about the request, i.e., does not save any data regarding the request (step 424). After receiving the reply message from the primary replica 24, the communication subsystem 22 sends the reply message to the application program 20 (step 426) and also asynchronously sends a forget message to the secondary replica 26 (step 428). The forget message includes the TID. In another embodiment of the present invention, the forget messages relating to a number of requests are sent to the secondary replica 26 as a batch. After receiving the reply message from the communication subsystem 22, the application program 20 resumes execution and can use the data from the reply message (step 430). After receiving the forget message from the communication subsystem 22, the secondary replica 26 forgets about the request, i.e., releases the saved TID, the data regarding the reply message, and the data regarding the performance of the requested service (step 432).

If the primary replica 24 or the secondary replica 26 fails during operation of the networked computer system 10 when the service provided by the primary replica and the secondary replica involves the secondary storage device 28, the system takes steps to recover from the failure. The steps to be taken depend upon which replica fails and at what point during operation the replica fails. The possible failures include:

1. the secondary replica 26 fails at any time;

2. the primary replica 24 fails before the primary replica receives the request from the communication subsystem 22;

3. the primary replica 24 fails after the primary replica receives the request from the communication subsystem 22, but before the primary replica sends the checkpoint message to the secondary replica 26;

4. the primary replica 24 fails after the primary replica sends the checkpoint message to the secondary replica 26, but before the primary replica performs the requested service;

5. the primary replica 24 fails after the primary replica performs the requested service, but before the primary replica sends the reply message to the communication subsystem 22; and 6. the primary replica 24 fails after the primary replica sends the reply message to the communication subsystem 22. The recovery from each of these possible failures will be described in detail below. Again, the detection of failures in computer systems is well-known in the art and will not be described herein.

In the first situation, where the secondary replica 26 fails at any time, no steps need to be taken to recover from the failure. Since the primary replica 24 did not fail, the requested service is performed and the reply message is sent to the communication subsystem 22. However, the primary replica 24 stops sending checkpoint messages to the secondary replica 26. If there is more than one secondary replica, the primary replica 24 continues sending checkpoint messages to any remaining secondary replicas.

In the sixth situation, where the primary replica 24 fails after the primary replica sends the reply message to the communication subsystem 22, no steps need to be taken to recover from the failure. When the primary replica 24 failed, the primary replica had already performed the requested service and sent a reply message to the communication subsystem 22.

In the second, third, fourth, and fifth situations, where the primary fails at some time before the primary replica sends the reply message to the communication subsystem 22, steps need to be taken to recover from the failure. The specific steps to be taken depend upon at what point in time the primary replica 24 fails. In each of the second, third, fourth, and fifth situations, the communication subsystem cannot determine when the primary replica 24 failed. Therefore, the communication subsystem 22 resends the request for the service to the secondary replica 26. The request includes the same TID that was sent to the primary replica 24 in the original request. The secondary replica 26 then determines when the primary replica 24 failed and takes the appropriate steps to recover from the failure based on the results of this determination.

Figure 5:
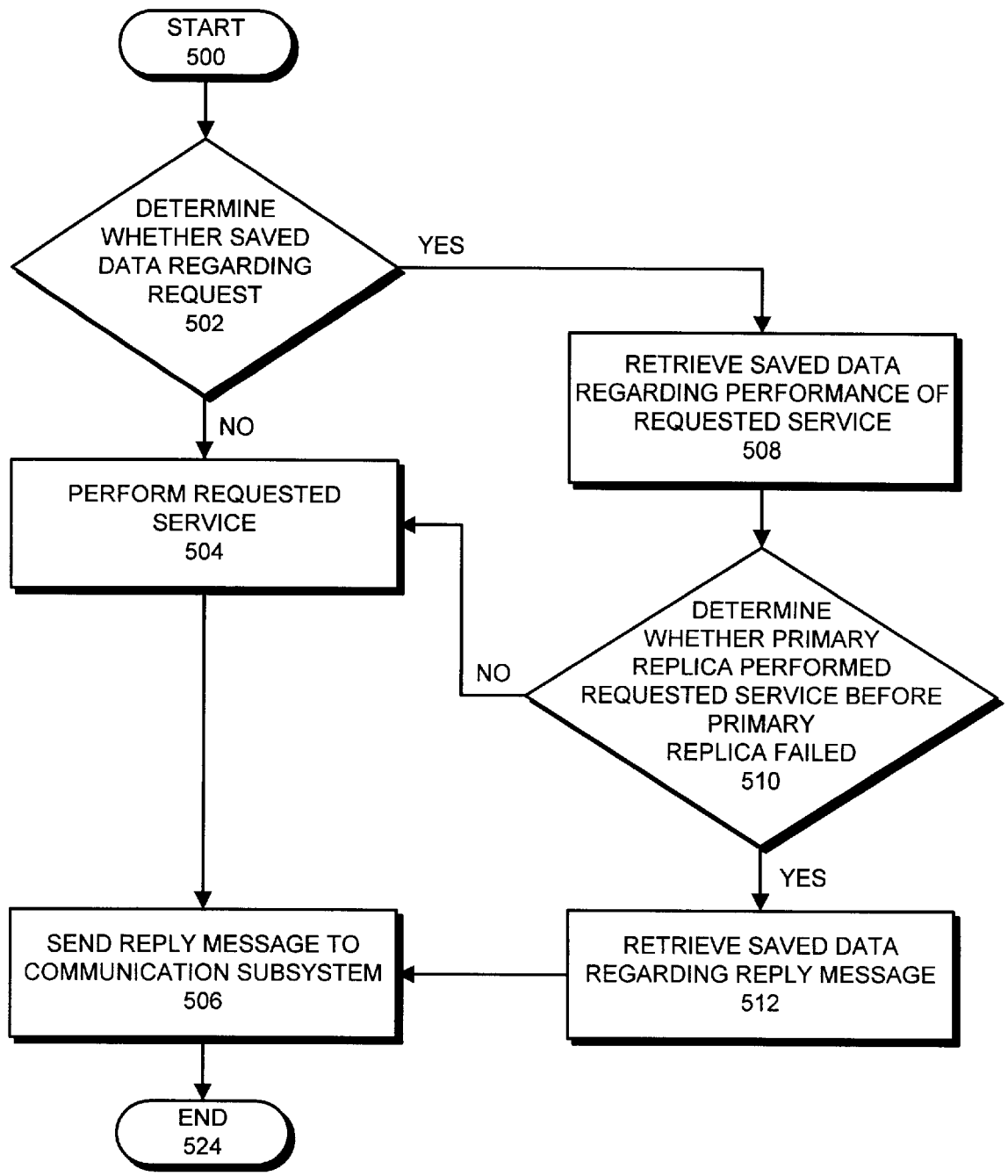
FIG. 5 is a flowchart generally illustrating the steps performed by the secondary replica in the recovery from certain failures of the primary replica in the operation of the networked computer system illustrated in FIGS. 4A and 4B.

FIG. 5 generally illustrates the steps performed by the secondary replica 26 to determine when the primary replica 24 failed and to recover from the failure. Initially, the secondary replica 26 determines whether the primary replica 24 had sent the checkpoint message before the primary replica failed. The secondary replica 26 makes this determination based on the data saved by the secondary replica when the secondary replica received checkpoint messages from the primary replica 24. The saved data included the TIDs uniquely identifying the requests. If the primary replica 24 had sent the checkpoint message before the primary replica failed, the secondary replica 26 will have saved data regarding the request and can use the saved data to determine whether the primary replica 24 had performed the requested service before the primary replica failed and, if the primary replica had, to reply to the communication subsystem 22. If the primary replica 24, however, had not sent the checkpoint message before the primary replica failed, the secondary replica 26 will not have saved data regarding the request and will have to process the request.

Referring to FIG. 5, the secondary replica 26 determines whether the secondary replica has saved data regarding the request (step 502). If the secondary replica 26 does not have saved data regarding the request, the primary replica 24 must have failed before the primary replica sent the checkpoint message (second or third situation). In this event, the secondary replica 26 performs the requested service (step 504) and then sends the reply message to the communication subsystem 22 (step 506). If the secondary replica 26 has saved data regarding the request, the primary replica 24 must have failed after the primary replica sent the checkpoint message (fourth or fifth situation). In this event, the secondary replica 26 retrieves the saved data regarding the performance of the requested service (step 508) and then determines whether the primary replica 24 had performed the requested service before the primary replica failed (step 510). If the primary replica 24 had not performed the requested service before the primary replica failed (fourth situation), the secondary replica 26 performs the requested service (step 504) and then sends the reply message to the communication subsystem 22 (step 506). If the primary replica 24 had performed the requested service before the primary replica failed (fifth situation), the secondary replica 26 retrieves the saved data regarding the reply message (step 512) and then sends the reply message to the communication subsystem 22 (step 506).

Additionally, in the second, third, fourth, fifth, and sixth situations, where the primary replica 24 fails, the communication subsystem 22 stops sending requests to the primary replica. In this event, the secondary replica 26 starts operating as the primary replica 24. If there is more than one secondary replica, any remaining secondary replicas continue operating as secondary replicas.

In each of the six failure situations described above, the protocol of the present invention behaves correctly. More specifically, the requested service is completely performed exactly once and the application program 20 receives the correct reply message. Furthermore, the state of the secondary replica 26 is consistent with the state of the primary replica 24 and the integrity of the secondary storage device 28 is ensured.

One of ordinary skill in the art will now appreciate that the present invention provides a method and system for achieving high availability in networked computer systems. The method and system include a software replication protocol that is more efficient and increases the processing capability of the system.

Further, since the client node in one embodiment of the present invention includes an application program and a communication subsystem and since the communication subsystem is responsible for communicating with the primary replica and the secondary replica, the operation of the protocol is transparent to the application program. One of ordinary skill in the art will appreciate that the server nodes could also be implemented using communication subsystems so that the operation of the protocol would be mainly transparent to the primary replica and the secondary replica as well.

Although the present invention has been shown and described with reference to a particular embodiment, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A method executed in a networked computer system for achieving high availability, the networked computer system including a client node and two server nodes connected to one another via a network, one of the server nodes including a primary replica and the other of the server nodes including a secondary replica, the method comprising the steps of:

receiving a request for a service from a client node by a primary replica;

performing an intention phase of the requested service by the primary replica;

after the intention phase, sending a checkpoint message from the primary replica to a secondary replica, the checkpoint message including data representing any change in a state of the primary replica as a result of performing the requested service;

updating a state of the secondary replica to reflect any change in the state of the primary replica using the data regarding the state of the primary replica from the checkpoint message;

sending an acknowledgement message from the secondary replica to the primary replica;

performing the requested service by the primary replica, wherein the step of performing the requested service by the primary replica occurs after the step of sending an acknowledgement message from the secondary replica to the primary replica;

sending a reply message from the primary replica to the client node; and receiving a forget message from the client node by the secondary replica.

2. The method of claim 1, wherein the step of performing the requested service by the primary replica occurs before the step of sending a checkpoint message from the primary replica to a secondary replica.

3. The method of claim 1, further including the steps of:
generating a transaction identifier by the client node that uniquely identifies the request for the service; and
including the transaction identifier in the request for the service.

4. The method of claim 3,
wherein the client node includes an application program and a communication subsystem;
wherein the step of receiving a request for a service from a client node by a primary replica includes the steps of:
receiving a request for the service from the application program by the communication subsystem, and
receiving a request for the service from the communication subsystem by the primary replica;
wherein the step of generating a transaction identifier by the client node includes the step of generating the transaction identifier by the communication subsystem; and
wherein the step of including the transaction identifier in the request for the service includes the step of including the transaction identifier in the request for the service by the communication subsystem.

5. The method of claim 1, wherein the step of performing the requested service by the primary replica includes the step of, while performing the requested service, acquiring any necessary locks to serialize execution of requests to data.

6. The method of claim 5, further including the step of:
releasing any acquired locks by the primary replica after the step of sending an acknowledgement message from the secondary replica to the primary replica.

7. The method of claim 1, wherein the step of performing an intention phase of the requested service by the primary replica includes the step of, while performing the intention phase of the requested service, acquiring any necessary locks to serialize execution of requests to data.

8. The method of claim 7, further including the step of:
releasing any acquired locks by the primary replica after the step of performing the requested service by the primary replica.

9. The method of claim 1,
wherein the client node includes an application program and a communication subsystem; and
wherein the step of sending a reply message from the primary replica to the client node includes the steps of:
sending a reply message from the primary replica to the communication subsystem, and
sending a reply message from the communication subsystem to the application program.

10. The method of claim 1, further including the steps of:
when the primary replica fails before sending a reply message to the client node:
receiving the request for the service from the client node by the secondary replica;
determining by the secondary replica whether the primary replica had sent the checkpoint message to the secondary replica before the primary replica failed;
if the primary replica failed before the primary replica sent the checkpoint message, performing the requested service by the secondary replica and sending a reply message from the secondary replica to the client node; and
if the primary replica failed after the primary replica sent the checkpoint message, retrieving saved data regarding the reply message and sending the reply message from the secondary replica to the client node.

11. The method of claim 10, wherein the step of determining by the secondary replica whether the primary replica had sent the checkpoint message to the secondary replica before the primary replica failed includes the step of determining by the secondary replica whether the secondary replica has saved data regarding the request.

12. The method of claim 1, further including the steps of:
when the primary replica fails before sending a reply message to the client node;
receiving the request for the service from the client node by the secondary replica; determining by the secondary replica whether the replica had sent the checkpoint message to the secondary replica before the primary replica failed;
if the primary replica failed before the primary replica sent the checkpoint message, performing the requested service by the secondary replica and sending a secondary replica to the reply message from the client node;
if the primary replica failed after the primary replica sent the checkpoint message, retrieving saved data regarding the performance of the requested service and determining by the secondary replica whether the primary replica had performed the requested service before the primary replica failed;
if the primary replica had not performed the requested service before the primary replica failed, performing the requested service by the secondary replica and sending the reply message from the secondary replica to the client node; and
if the primary replica had performed the requested service before the primary replica failed, retrieving saved data regarding the reply message and sending the reply message from the secondary replica to the client node.

13. The method of claim 12, wherein the step of determining by the secondary replica whether the primary replica had sent the checkpoint message to the secondary replica before the primary replica failed includes the step of determining by the secondary replica whether the secondary replica has saved data regarding the request.

a computer readable medium in which the computer readable program codes are stored.

14. A method executed in a networked computer system for achieving high availability, the networked computer system including a client node and two server nodes connected to one another via a network, one of the server nodes including a primary replica and the other of the server nodes including a secondary replica, the method comprising the steps of:

receiving a request for a service from a client node by a primary replica;

sending a checkpoint message from the primary replica to a secondary replica, the checkpoint message including data representing any change in a state of the primary replica as a result of performing the requested service;

saving data from the checkpoint message by the secondary replica, the saved data including a transaction identifier and data necessary for the secondary replica to construct the content of the reply message that the primary replica is going to send to the client node;

updating a state of the secondary replica to reflect any change in the state of the primary replica using the data regarding the state of the primary replica from the checkpoint message;

sending an acknowledgement message from the secondary replica to the primary replica;

sending a reply message from the primary replica to the client node; and receiving a forget message from the client node by the secondary replica.

15. A method executed in a networked computer system for achieving high availability, the networked computer system including a client node and two server nodes connected to one another via a network, one of the server nodes including a primary replica and the other of the server nodes including a secondary replica, the method comprising the steps of:

receiving a request for a service from a client node by a primary replica;

sending a checkpoint message from the primary replica to a secondary replica, the checkpoint message including data representing any change in a state of the primary replica as a result of performing the requested service;

saving data from the checkpoint message by the secondary replica, the saved data including a transaction identifier, data necessary for the secondary replica to construct the content of the reply message that the primary replica is going to send to the client node, and data necessary for the secondary replica to determine whether the requested service has been performed by the primary replica;

updating a state of the secondary replica to reflect any change in the state of the primary replica using the data regarding the state of the primary replica from the checkpoint message;

sending an acknowledgement message from the secondary replica to the primary replica;

sending a reply message from the primary replica to the client node; and receiving a forget message from the client node by the secondary replica.

16. A method executed in a networked computer system for achieving high availability, the networked computer system including a client node and two server nodes connected to one another via a network, one of the server nodes including a primary replica and the other of the server nodes including a secondary replica, the method comprising the steps of:

receiving a request for a service from a client node by a primary replica;

sending a checkpoint message from the primary replica to a secondary replica, the checkpoint message including data representing any change in a state of the primary replica as a result of performing the requested service;

updating a state of the secondary replica to reflect any change in the state of the primary replica using the data regarding the state of the primary replica from the checkpoint message;

sending an acknowledgement message from the secondary replica to the primary replica;

sending a reply message from the primary replica to the client node;

forgetting about the request by the primary replica after the step of sending a reply message from the primary replica to the client node; and receiving a forget message from the client node by the secondary replica.

17. A method executed in a networked computer system for achieving high availability, the networked computer system including a client node and two server nodes connected to one another via a network, one of the server nodes including a primary replica and the other of the server nodes including a secondary replica, the method comprising the steps of:

receiving a request for a service from a client node by a primary replica;

sending a checkpoint message from the primary replica to a secondary replica, the checkpoint message including data representing any change in a state of the primary replica as a result of performing the requested service;

updating a state of the secondary replica to reflect any change in the state of the primary replica using the data regarding the state of the primary replica from the checkpoint message;

sending an acknowledgement message from the secondary replica to the primary replica;

sending a reply message from the primary replica to the client node; and resuming execution and using data from the reply message by the client node after the step of sending a reply message from the primary replica to the client node; and receiving a forget message from the client node by the secondary replica.

18. A method executed in a networked computer system for achieving high availability, the networked computer system including a client node and two server nodes connected to one another via a network, one of the server nodes including a primary replica and the other of the server nodes including a secondary replica, the method comprising the steps of:

receiving a request for a service from a client node by a primary replica;

sending a checkpoint message from the primary replica to a secondary replica, the checkpoint message including data representing any change in a state of the primary replica as a result of performing the requested service;

updating a state of the secondary replica to reflect any change in the state of the primary replica using the data regarding the state of the primary replica from the checkpoint message;

sending an acknowledgement message from the secondary replica to the primary replica;

sending a reply message from the primary replica to the client node;

receiving a forget message from the client node by the secondary replica; and forgetting about the request by the secondary replica after the step of receiving a forget message from the client node by the secondary replica.

19. A computer program product for achieving high availability in a networked computer system, the networked computer system including a client node and two server nodes connected to one another via a network, one of the server nodes including a primary replica and the other of the server nodes including a secondary replica, the computer program product comprising:

computer readable program code configured to perform an intention phase of the requested service by the primary replica;

computer readable program code configured to receive a request for a service from a client node by a primary replica;

computer readable program code configured to perform the requested service by the primary replica;

computer readable program code configured to send a checkpoint message from the primary replica to a secondary replica, the checkpoint message including data representing any change in a state of the primary replica as a result of performing the requested service;

wherein the computer readable program code configured to perform the intention phase of the requested service by the primary replica is further configured to execute before the computer readable program code configured to send a checkpoint message from the primary replica to a secondary replica;

computer readable program code configured to update a state of the secondary replica to reflect any change in the state of the primary replica using the data regarding the state of the primary replica from the checkpoint message;

computer readable program code configured to send an acknowledgement message from the secondary replica to the primary replica;

wherein the computer readable program code configured to perform the requested service by the primary replica is further configured to execute after the computer readable program code configured to send an acknowledgement message from the secondary replica to the primary replica;

computer readable program code configured to send a reply message from the primary replica to the client node;

computer readable program code configured to receive a forget message from the client node by the secondary replica; and a computer readable medium in which the computer readable program codes are stored.

20. The computer program product of claim 19, wherein the computer readable program code configured to perform the requested service by the primary replica is further configured to execute before the computer readable program code configured to send a checkpoint message from the primary replica to a secondary replica.

21. The computer program product of claim 19, further including:

computer readable program code configured to generate a transaction identifier by the client node that uniquely identifies the request for the service; and computer readable program code configured to include the transaction identifier in the request for the service.

22. The computer program product of claim 19, further including:

computer readable program code configured to, when the primary replica fails before sending a reply message to the client node:

receive the request for the service from the client node by the secondary replica;

determine by the secondary replica whether the primary replica had sent the checkpoint message to the secondary replica before the primary replica failed;

if the primary replica failed before the primary replica sent the checkpoint message, perform the requested service by the secondary replica and send a reply message from the secondary replica to the client node; and if the primary replica failed after the primary replica sent the checkpoint message, retrieve saved data regarding the reply message and send the reply message from the secondary replica to the client node.

23. The computer program product of claim 19, further including:

computer readable program code configured to, when the primary replica fails before sending a reply message to the client node;

receive the request for the service from the client node by the secondary replica;

determine by the secondary replica whether the primary replica had sent the checkpoint message to the secondary replica before the primary replica failed;

if the replica failed before the primary replica sent the checkpoint message, perform the requested service by the secondary replica and send a reply message from the secondary replica to the client node;

if the primary replica failed after the primary replica sent the checkpoint message, retrieve saved data regarding the performance of the requested service and determine by the secondary replica whether the primary replica had performed the requested service before the primary replica failed;

if the primary replica had not performed the requested service before the primary replica failed, perform the requested service by the secondary replica and send the reply message from the secondary replica to the client node; and if the primary replica had performed the requested service before the primary replica failed, retrieve saved data regarding the reply message and send the reply message from the secondary replica to the client node.

24. A computer program product for achieving high availability in a networked computer system, the networked computer system including a client node and two server nodes connected to one another via a network, one of the server nodes including a primary replica and the other of the server nodes including a secondary replica, the computer program product comprising:

computer readable program code configured to receive a request for a service from a client node by a primary replica;

computer readable program code configured to perform the requested service by the primary replica;

computer readable program code configured to send a checkpoint message from the primary replica to a secondary replica, the checkpoint message including data representing any change in a state of the primary replica as a result of performing the requested service;

computer readable program code configured to save data from the checkpoint message by the secondary replica, the saved data including a transaction identifier and data necessary for the secondary replica to construct the content of the reply message that the primary replica is going to send to the client node;

computer readable program code configured to update a state of the secondary replica to reflect any change in the state of the primary replica using the data regarding the state of the primary replica from the checkpoint message;

computer readable program code configured to send an acknowledgement message from the secondary replica to the primary replica;

computer readable program code configured to send a reply message from the primary replica to the client node;

computer readable program code configured to receive a forget message from the client node by the secondary replica; and a computer readable medium in which the computer readable program codes are stored.

25. A computer program product for achieving high availability in a networked computer system, the networked computer system including a client node and two server nodes connected to one another via a network, one of the server nodes including a primary replica and the other of the server nodes including a secondary replica, the computer program product comprising:

computer readable program code configured to receive a request for a service from a client node by a primary replica;

computer readable program code configured to perform the requested service by the primary replica;

computer readable program code configured to send a checkpoint message from the primary replica to a secondary replica, the checkpoint message including data representing any change in a state of the primary replica as a result of performing the requested service;

computer readable program code configured to save data from the checkpoint message by the secondary replica, the saved data including a transaction identifier, data necessary for the secondary replica to construct the content of the reply message that the primary replica is going to send to the client node, and data necessary for the secondary replica to determine whether the requested service has been performed by the primary replica;

computer readable program code configured to update a state of the secondary replica to reflect any change in the state of the primary replica using the data regarding the state of the primary replica from the checkpoint message;

computer readable program code configured to send an acknowledgement message from the secondary replica to the primary replica;

computer readable program code configured to send a reply message from the primary replica to the client node;

computer readable program code configured to receive a forget message from the client node by the secondary replica; and a computer readable medium in which the computer readable program codes are stored.

26. A computer program product for achieving high availability in a networked computer system, the networked computer system including a client node and two server nodes connected to one another via a network, one of the server nodes including a primary replica and the other of the server nodes including a secondary replica, the computer program product comprising:

computer readable program code configured to receive a request for a service from a client node by a primary replica;

computer readable program code configured to perform the requested service by the primary replica;

computer readable program code configured to send a checkpoint message from the primary replica to a secondary replica, the checkpoint message including data representing any change in a state of the primary replica as a result of performing the requested service;

computer readable program code configured to update a state of the secondary replica to reflect any change in the state of the primary replica using the data regarding the state of the primary replica from the checkpoint message;

computer readable program code configured to send an acknowledgement message from the secondary replica to the primary replica;

computer readable program code configured to send a reply message from the primary replica to the client node;

computer readable program code configured to receive a forget message from the client node by the secondary replica;

computer readable program code configured to forget about the request by the primary replica;

wherein the computer readable program code configured to forget about the request by the primary replica is further configured to execute after the computer readable program code configured to send a reply message from the primary replica to the client node; and a computer readable medium in which the computer readable program codes are stored.

27. A computer program product for achieving high availability in a networked computer system, the networked computer system including a client node and two server nodes connected to one another via a network, one of the server nodes including a primary replica and the other of the server nodes including a secondary replica, the computer program product comprising:

computer readable program code configured to receive a request for a service from a client node by a primary replica;

computer readable program code configured to perform the requested service by the primary replica;

computer readable program code configured to send a checkpoint message from the primary replica to a secondary replica, the checkpoint message including data representing any change in a state of the primary replica as a result of performing the requested service;

computer readable program code configured to update a state of the secondary replica to reflect any change in the state of the primary replica using the data regarding the state of the primary replica from the checkpoint message;

computer readable program code configured to send an acknowledgement message from the secondary replica to the primary replica;

computer readable program code configured to send a reply message from the primary replica to the client node;

computer readable program code configured to receive a forget message from the client node by the secondary replica;

computer readable program code configured to resume execution and use data from the reply message by the client node;

wherein the computer readable program code configured to resume execution and use data from the reply message by the client node is further configured to execute after the computer readable program code configured to send a reply message from the primary replica to the client node; and a computer readable medium in which the computer readable program codes are stored.

28. A computer program product for achieving high availability in a networked computer system, the networked computer system including a client node and two server nodes connected to one another via a network, one of the server nodes including a primary replica and the other of the server nodes including a secondary replica, the computer program product comprising:

computer readable program code configured to receive a request for a service from a client node by a primary replica;

computer readable program code configured to perform the requested service by the primary replica;

computer readable program code configured to send a checkpoint message from the primary replica to a secondary replica, the checkpoint message including data representing any change in a state of the primary replica as a result of performing the requested service;

computer readable program code configured to update a state of the secondary replica to reflect any change in the state of the primary replica using the data regarding the state of the primary replica from the checkpoint message;

computer readable program code configured to send an acknowledgement message from the secondary replica to the primary replica;

computer readable program code configured to send a reply message from the primary replica to the client node;

computer readable program code configured to receive a forget message from the client node by the secondary replica;

computer readable program code configured to forget about the request by the secondary replica;

wherein the computer readable program code configured to forget about the request by the secondary replica is further configured to execute after the computer readable program code configured to receive a forget message from the client node by the secondary; and a computer readable medium in which the computer readable program codes are stored.

29. A system for achieving high availability in a networked computer system, the system comprising:

a server node including a primary replica connected to a network;

a server node including a secondary replica connected to the network;

wherein the primary replica is configured to receive a request for a service from a client node connected to the network, perform the requested service, send a checkpoint message to the secondary replica, and send a reply message to the client node, the checkpoint message including data representing any change in a state of the primary replica as a result of performing the requested service;

wherein the primary replica is further configured to perform an intention phase of the requested service before sending a checkpoint message to the secondary replica; and wherein the secondary replica is configured to update a state of the secondary replica to reflect any change in the state of the primary replica using the data regarding the state of the primary replica from the checkpoint message, send an acknowledgement message to the primary replica, and receive a forget message from the client node;

wherein the primary replica is further configured to perform the requested service after the secondary replica sends an acknowledgement message to the primary replica.

30. The system of claim 29, wherein the primary replica is further configured to perform the requested service before sending a checkpoint message to the secondary replica.

31. The system of claim 29, wherein the client node is configured to generate a transaction identifier that uniquely identifies the request for the service and include the transaction identifier in the request for the service.

32. The system of claim 29, wherein the secondary replica is further configured to, when the primary replica fails before sending a reply message to the client node:

receive the request for the service from the client node, determine whether the primary replica had sent the checkpoint message to the secondary replica before the primary replica failed, if the primary replica failed before the primary replica sent the checkpoint message, perform the requested service and send a reply message to the client node, and if the primary replica failed after the primary replica sent the checkpoint message, retrieve saved data regarding the reply message and send the reply message to the client node.

33. The system of claim 29, wherein the secondary replica is further configured to, when the primary replica fails before sending a reply message to the client node:

receive the request for the service from the client node, determine whether the primary replica had sent the checkpoint message to the secondary replica before the p a replica failed, if the primary replica failed before the primary replica sent the checkpoint message, perform the requested service and send a reply message to the client node, if the primary replica failed after the primary replica sent the checkpoint message, retrieve saved data regarding the performance of the requested service and determine whether the primary replica had performed the requested service before the primary replica failed, if the primary replica had not performed the requested service before the primary replica failed, perform the requested service and send the reply message to the client node, and if the primary replica had performed the requested service before the replica failed, retrieve saved data regarding the reply message and send the reply message to the client node.

* * * * *